United States Patent [19]

Nasr et al.

[11] Patent Number: 5,459,168
[45] Date of Patent: Oct. 17, 1995

[54] PROCESS FOR SEPARATING LOW MOLECULAR WEIGHT COMPOUNDS FROM AN IMPURE THERMOPLASTIC POLYMER OR MIXTURE

[75] Inventors: Hedi B. Nasr, Gelsenkirchen; Manfred Grabow, Ratingen; Klaus Reimann, Essen, all of Germany

[73] Assignee: Fried. Krupp AG Hoesch-Krupp, Essen, Germany

[21] Appl. No.: 293,151

[22] Filed: Aug. 19, 1994

[30] Foreign Application Priority Data

Aug. 20, 1993 [DE] Germany ............... 43 28 013.7

[51] Int. Cl.⁶ .................. C08F 6/00; C08J 11/04
[52] U.S. Cl. .................. 521/49.8; 528/323; 528/481; 528/489; 528/501
[58] Field of Search .................. 528/501, 481, 528/489, 323; 521/49.8

[56] References Cited

U.S. PATENT DOCUMENTS

| | | | |
|---|---|---|---|
| 2,872,420 | 2/1959 | Kruyff ................. | 521/49.8 |
| 3,578,640 | 5/1971 | Twilley et al. . | |
| 3,683,511 | 8/1972 | Johnson et al. . | |
| 3,799,234 | 3/1974 | Skidmore . | |
| 3,810,858 | 5/1974 | Boldebuck .............. | 521/49.8 |
| 4,963,650 | 10/1990 | Bokareva et al. . | |
| 5,164,030 | 11/1992 | Casper et al. .......... | 528/501 |
| 5,314,579 | 5/1994 | Sung ................... | 528/501 |

FOREIGN PATENT DOCUMENTS

3932793  9/1989  Germany .

Primary Examiner—Morton Foelak
Attorney, Agent, or Firm—Spencer, Frank & Schneider

[57] ABSTRACT

A process for treating an impure thermoplastic polymer, including raw and recycled polymers, during extrusion to separate low molecular weight compounds therefrom, including: introducing a separating agent into plasticized impure thermoplastic polymer passing through a first high pressure zone, the low molecular weight compounds of the plasticized polymer being at least partially soluble in the separating agent; extracting at least a part of the low molecular weight compounds from the plasticized polymer into the separation agent during passage of the plasticized polymer through an extraction zone; removing the separating agent charged with low molecular weight compounds from the extruder as the plasticized polymer passes through a low pressure zone having a residual pressure, P, which is lower the introductory pressure, $P_e$, and for which 1 bar$\geq P \geq P_c$; collecting the charged separating agent as it is removed from the extruder; thermal vacuum treating the plasticized polymer as it passes through a last low pressure zone to vacuum degas the plasticized polymer at a pressure, $P_v$, for which $P_v < 0.5$ bar and thereby further remove separating agent and low molecular weight compounds from the plasticized polymer; and passing the plasticized polymer through a last high pressure zone to an extruder head. The combination of solvent extraction in the extruder with subsequent vacuum degassing results in removal of large amounts of low molecular weight compounds with a relatively small expenditure of energy since energy-intensive vacuum degassing is needed only for removal of residuals.

19 Claims, 5 Drawing Sheets

PROCESS FOR SEPARATING LOW MOLECULAR WEIGHT COMPOUNDS FROM AN IMPURE THERMOPLASTIC POLYMER OR MIXTURE

CROSS-REFERENCE TO RELATED APPLICATIONS

The present application claims the right of foreign priority with respect to Application No. P 43 28 013.7 filed in Germany on Aug. 20, 1993, the subject matter of which is incorporated herein by reference.

BACKGROUND OF THE INVENTION

1. Field of the Invention

The present invention relates to a process for treating an impure thermoplastic polymer, such as raw polymers and recycled polymers, during passage thereof through an extrusion apparatus to separate and remove low molecular weight compounds therefrom. More particularly, the process according to the present invention relates to a novel procedure for extracting at least a part of the low molecular weight compounds from the plasticized impure thermoplastic polymer into a separation agent and removal of the separating agent charged with low molecular weight compounds from the extrusion apparatus prior to thermal vacuum treating the plasticized polymer to vacuum degas the plasticized polymer and thereby further remove separating agent and low molecular weight compounds from the plasticized polymer. The combination of solvent extraction in the extrusion apparatus with subsequent vacuum degassing results in removal of large amounts of low molecular weight compounds with a relatively small expenditure of energy so that energy-intensive vacuum degassing is needed only for removal of residual separation agent and low molecular weight compounds.

2. Description of the Related Art

A process of this type is known from Federal Republic of Germany Published Application No. 39 32 793 A1, which corresponds to U. S. Pat. No. 4,963,650, the disclosure of which is incorporated herein by reference, for the treatment of a polyamide-6 melt with steam. This document points out that, when saturated steam is used, it is also possible that the steam might escape from the extruder in a direction counter to the movement of the melt if the pressure distribution is improperly set and should be avoided per se. However, the invention dealt with in Federal Republic of Germany Published Application No. 39 32 793 A1 relates to a repeated treatment of polycaproamide melts and their copolymers in an extruder with superheated steam and thermal vacuum degassing for separating low molecular compounds therefrom.

Even though the amount of water to be introduced into the polymer melt ahead of each degassing zone in this published Application is limited to 150%, referring to the low molecular weight compounds initially contained in the original melt, the amount of water to be charged and removed makes considerable demands on the capacity of the vacuum installation. This installation is required to continuously maintain a vacuum in all low pressure zones for separating the charged water in order to obtain a residual amount of low molecular weight components of at most 1.8% at the end.

Also, in contrast to the expert opinion expressed in Federal Republic of Germany Published Application No. 39 32 793 A1 not to permit a counterflow in the course of purifying polyamide-6 with saturated steam, U.S. Pat. No. 3,799,234, the disclosure of which is incorporated herein by reference, expressly proposes a counterflow of separating agent in such a process, which separating agent may be steam in certain cases for the separating treatment of plastics. A vacuum treatment is also provided as an alternative to aiding the removal of the charged separating agent. However, the requirement in U.S. Pat. No. 3,799,234 that the gas must be inert and that a suitable one must be selected from the multitude of inert gases does not make it clear whether a thermal vacuum treatment of polymers is also intended, similar to that of polymer condensates.

A thermal treatment for separating low molecular weight compounds from thermoplastic polymers in an extruder with an underpressure as the residual pressure or, alternatively, with exhaust into the atmosphere as the upper pressure limit, can be found in the two references mentioned above. This exhaust into the atmosphere is the lower limit in a non-species-related, same direction flow process known from U.S. Pat. No. 3,683,511, the disclosure of which is incorporated herein by reference, wherein residual pressures of up to 10 bar are provided in order to drive highly volatile hydrocarbons from the elastomers.

Finally, other processes for the thermal vacuum treatment of polymer melts in an extruder are treated in Federal Republic of Germany Published Patent Application No. 39 32 793 A1, such as the already mentioned introduction of saturated steam.

The various processes have been developed with the aim of purifying polymer melts by removing undesired components and to achieve the required quality in this way. Degassing in vacuum with or without the use of entrainers has gained acceptance in practical applications as the most important technique, however, the energy requirements of such prior art processes are quite high.

It is therefore an object of the present invention to further develop the known continuous process and to provide an operationally dependable and efficient process for separating low molecular weight compounds from impure thermoplastic polymers, particularly for lactam removal from polyamide-6, which results in low residual amounts of low molecular weight compounds, i.e., in extensive purification of the polymer, with a relatively low energy expenditure.

It is a further object of the present invention to create a flexible process wherein a thermoplastic polymer in solid form, such as a granulate, chip, powder, etc., can be used as the initial material to be treated and introduced in solid form or in a molten state, for example, from a polyaddition reactor, or in the form of a polymer solution or polymer paste, and which can be advantageously combined with further processing steps, such as admixing additives, granulation or subsequent further processing, for example, into spun fibers.

SUMMARY OF THE INVENTION

These and other objects are accomplished by the present invention which provides a process for treating an impure thermoplastic polymer, including raw polymers and recycled polymers, during passage thereof through an extrusion apparatus to separate and remove low molecular weight compounds therefrom. The extrusion apparatus is comprised of a heated worm housing in which are defined, in the order recited, a heating zone, a first low pressure zone, an extraction zone, a first high pressure zone, a last low pressure zone, and a last high pressure zone, and an extruder head. An impure thermoplastic polymer is plasticized by passing the impure thermoplastic polymer through the heating zone of the extrusion apparatus. As used herein, "an impure thermoplastic polymer" is intended to include a homopolymer, a mixture of respective homopolymers, a copolymer, a mixture of respective copolymers, and polymer mixtures of any type. Moreover, the impure thermoplastic polymer may be introduced into the extrusion apparatus as a solid, melt, paste or solution in any suitable solvent. The impure thermoplastic polymer is heated in the heating zone to plasticize or melt the impure thermoplastic polymer and/or to bring the plasticized or molten polymer to a temperature effective for the following separation process. A separating agent having a critical pressure, $P_c$, is introduced into the plasticized polymer passing through the first high pressure zone of the extrusion apparatus at an introduction pressure, $P_e$. The low molecular weight compounds of the plasticized polymer are at least partially soluble in the separating agent. At least a part of the low molecular weight compounds are extracted from the plasticized polymer into the separation agent during passage of the plasticized polymer through the extraction zone. The separating agent charged with low molecular weight compounds is then removed from the extrusion apparatus as the plasticized polymer passes through a low pressure zone, which low pressure zone is one of upstream or downstream of the first high pressure zone and is upstream of the last low pressure zone, and which has a residual pressure, (P), which is lower than the introduction pressure, $P_e$, in the first high pressure zone and which satisfies the requirement 1 bar$\geq P \geq P_c$. The separating agent charged with low molecular weight compounds is collected as it is removed from the extrusion apparatus. The plasticized polymer is subjected to thermal vacuum treatment as it passes through the last low pressure zone to vacuum degas the plasticized polymer at a pressure, $P_v$, for which $P_v<10.5$ bar, preferably, $P_v<0.05$ bar, and thereby further remove separating agent and low molecular weight compounds from the plasticized polymer. Finally, the plasticized polymer is passed through the last high pressure zone to the extruder head from which purified thermoplastic polymer is recovered.

Preferably, the separating agent passes through the extrusion apparatus in a direction which is primarily counter to that of the passage of the plasticized polymer as a counterflow, and the low pressure zone from which the separating agent charged with low molecular weight compounds is removed as the plasticized polymer passes therethrough in the first low pressure zone and is upstream of the first high pressure zone.

The invention additionally contemplates separating low molecular weight compounds from one of a recycled plastic or a recycled plastic mixture, using the process according to the present invention in which the recycled plastic or recycled plastic mixture is treated as described in the foregoing. Low molecular weight compounds may also be separated from a raw plastic, i.e., a preparative reaction mixture, in the form of a mixture of substances by treating the raw plastic as described in the foregoing. The raw plastic may be, by way of example but not limitation, polyamide-6 which contains, as a low molecular weight compound, $\in$-caprolactam.

To attain these objects it is therefore proposed by the invention that on its way through the extruder the plasticized polymer first moves through a low pressure zone with a residual pressure, P, which satisfies the requirement: 1 bar$\geq P \geq P_c$, wherein $P_c$ is the critical pressure of the separating agent, and from which a separating agent charged with side compounds is removed before the thermal vacuum treatment of the plasticized polymer by means of vacuum degassing at an underpressure, $P_v$, such that $P_v<0.5$ bar, preferably $P_v<0.05$ bar, in the last low pressure zone takes place.

The combination in accordance with the invention of a solvent extraction in the extruder at a residual pressure P of at least 1 bar with subsequent vacuum degassing results in removal of large amounts of low molecular compounds from the impure thermoplastic polymer mixture of substances with a relatively small expenditure of energy so that the energy-intensive vacuum only needs to be maintained for the removal of relatively small residual amounts of low molecular weight compounds and separating agent. Thus, regarding its energy expenditure, the process step of thermal vacuum treatment is independent, to a large extent, of the original content of low molecular weight compounds in the impure thermoplastic polymer mixture of substances. It is also independent of whether a relatively or absolutely large or very large amount of separating agent was previously introduced and removed again at $\geq 1$ bar. In this way, the thermal vacuum treatment, which is—as a practical matter—thus limited to a final degassing, becomes especially effective.

Preferable, thermal vacuum treatment of the plasticized polymer is performed only after the content of low molecular compounds therein has been lowered, by removal thereof from the plasticized polymer by extraction into the separating agent, to $\leq 10\%$ of the original content of low molecular compounds within the impure thermoplastic polymer.

In a preferred embodiment, the extrusion apparatus further comprises a second high pressure zone into which additional separating agent is introduced at an introduction pressure, $P_e$, prior to passage of the plasticized polymer through the last high pressure zone; and a second low pressure zone which has a residual pressure, P, which is lower than the introduction pressure, $P_e$, and which satisfies the requirement 1 bar$\geq P \geq P_c$, and from which the additional separating agent charged with low molecular weight compounds is removed as the plasticized polymer passes therethrough. This second high pressure zone and the second low pressure zone are positioned downstream of the first low pressure zone and the first high pressure zone, and upstream of the last low pressure zone. The separating agent and additional separating agent pass through the extrusion apparatus in a direction which is primarily counter to the passage of the plasticized polymer as counterflows. Additionally, the low pressure zone from which the separating agent charged with low molecular weight compounds is removed as the plasticized polymer passes therethrough is the first low pressure zone having residual pressure, P, and the low pressure zone from which the additional separating agent charged with low molecular weight compounds is removed as the plasticized polymer passes therethrough is the second low pressure zone.

Preferably, the residual pressure, P, ranges between 1 and 8 bar, and the introduction of separating agent takes place at a introduction pressure, $P_e$, which lies in a range which satisfies the requirement $P<P_e\geq P_c$.

A basic process variant is preferred, wherein the preponderant portion of a separating agent introduced into the high pressure zone and charged there with side components, i.e., low molecular weight compounds, is guided in a counterflow and is removed from the low pressure extraction zone upstream of the high pressure zone.

It is furthermore proposed that the thermal vacuum treatment is only to be performed after the content of low molecular weight compounds has been lowered to ≦10% of the original content of low molecular weight compounds of the mixture of substances.

Incidentally, the introduction of the separating agent is to be performed at an introduction pressure, $P_e$, which lies above the residual pressure, P, of the associated low pressure extraction zone, but should not exceed the critical pressure, $P_c$, of the separating agent.

A residual pressure P between 1 and 8 bar and the introduction of the separating agent at an introduction pressure, $P_e$, which lies in the range provided by the function $p<p_e<P_c$ is considered to be an advantageous process parameter mainly for the zone with a preponderant back flow of the charged separating agent. This also includes the surprising fact that excellent purifying effects can be obtained with relatively low pressure differentials.

In accordance with a preferred embodiment of the invention, the separation treatment of the mixture of substances takes place in accordance with a process wherein the plasticized polymer passes through two high pressure zones, into which the separating agent is introduced under pressure in such a way that both high pressure zones are assigned to the zone area with a counterflow, that a low pressure zone in which the defined residual pressure, P, prevails lies upstream of both high pressure zones, and that charged separating agent is removed from both low pressure zones.

It is basically advantageous if the removal of the charged separating agent immediately following the solvent extraction takes place from the front low pressure zones at a feed pressure, $p_f$, which satisfies the requirements for the residual pressure, P.

In many cases, water can be the separating agent, or other agents which are liquid under normal conditions (1 bar absolute and 20° C.), such as alcohols. In special cases, gaseous $CO_2$ or $N_2$ is used and is introduced into the plasticized polymer as a compressed gas. In this case, the gas is a solvent in the thermodynamic sense for the low molecular weight compounds so that it is possible, when using such gases, to speak of a kind of solvent extraction, i.e., the selective removal of defined substances.

A mixture of a separating agent or solvent which is liquid at 20° C. and 1 bar abs., and $CO_2$ or $N_2$ may be used.

With the separation or purifying process in accordance with the invention, it is also possible to introduce the solvent, which under normal conditions is a liquid, in the form of a vapor, such as steam. With gaseous solvents, it is thus possible to take advantage of the increased dissolving capability of compressed gases to obtain a better purifying effect.

Thus, the advantages of the invention basically become useful when treating mixtures of substances containing thermoplastic polymers as the main component, wherein the side components are contaminants or byproducts of a process. Such contaminants include, for example, solvent residues, perhaps from the polymerization process, monomers, oligomers, catalyst residues, side products from, for example, the polymerization reaction, decomposition products or other substances, such as fragrances and/or flavorings, additives or foreign substances diffused into the polymeric material during use which impair the properties of the polymer and/or limit its use.

Side components in the sense of the present invention can also be valuable substances which are recovered. For example, in the course of purifying raw polyamide-6 with a monomer content of 8 to 10 weight-%, the extracted ∈-caprolactam is recovered and can be recycled for use, after appropriate processing, for producing polyamide-6 (polycaprolactam).

The advantageous employment of the process in accordance the present invention extends to separating low molecular weight compounds in the course of processing recycled plastics and recycled plastic mixtures, and also the thermal vacuum treatment of a raw plastic. The raw plastic and/or the recycled plastic can be a mixture containing, for example, polyamide-6 as the main component and ∈-caprolactam as the low molecular weight, side component.

The process with water as the separating agent, which is introduced as steam into the plasticized polymer, is preferably operated with the stipulation that at least 200% water, referring to the initial mass content of low molecular weight compounds, such as ∈-caprolactam, of the mixture of substances, are introduced. Thus, the separating agent may be water, which is introduced into the plasticized polymer as steam and which is introduced in an amount which is 200% by weight based on the initial weight of low molecular compounds in the impure thermoplastic polymer.

When applying the process for separating raw plastics or recycled plastics, in particular for separating ∈-caprolactam, in several extraction steps, more than 50 mass % of the water will be introduced into first high pressure zone and less than 50 mass % into the second high pressure zone located closer to the final thermal vacuum treatment. Thus, the separating agent may be water, in which case it is advantageous that more than 50 weight % of the water employed is introduced into the first high pressure zone, that less than 50 weight % of the water employed is introduced into the second high pressure zone, that the first low pressure zone has a residual pressure, $P_1$, and the second low pressure zone has a residual pressure, $P_2$, and that the residual pressure, $P_1$, is higher than the residual pressure, $P_2$, and $P_1-P_2$ is at least 1 bar.

On an industrial scale, polyamide-6 is obtained from ∈-caprolactam primarily by hydrolytic conversion. In the course of this, a thermodynamic balance occurs between the polycondensate polyamide-6 (PA 6), the monomer ∈-caprolactam and various, mainly cyclic, dimers and oligomers, which essentially is a function of the temperature and the water content. This mixture with approximately 8 to 10% monomer content (∈-caprolactam) must be brought down to as low as possible a content of monomer. As a rule, two methods are regularly employed for this, namely, vacuum degassing of the highly volatile components out of the melt (known, for example, from U.S. Pat. No. 3,578,640, the disclosure of which is incorporated herein by reference) or extraction of the low molecular weight compounds of PA 6 granulate with hot water at slight overpressure, which is remote from the invention.

In connection with the removal of ∈-caprolactam, both of these methods not only require a large amount of time and are cost-intensive, but also entail considerable technical and/or environmental problems. For example, in the course of extraction of the PA 6 granulate with hot water, approximately ten times the amount of water is needed and the extracted ∈-caprolactam must be recovered from a very much diluted aqueous solution. In addition, the moist granulate containing approximately 30 weight % of water must be dried using a relatively large amount of energy to a residual moisture content of approximately 0.1%. Furthermore, remelting of the granulate is required for admixing of additives and/or further processing. Then also, reverse reaction into monomers and oligomers must be accepted, as well as the additional energy expenditure.

During vacuum degassing of the polymer melt, however, a continuous vacuum of less than 10 mbar is required as a rule, as previously stressed, which calls for expensive, large vacuum pumps and a great energy expenditure. In addition, the degassed $\epsilon$-caprolactam tends to condense on the walls of the pipelines to the vacuum unit. Thus, a trouble-free continuous operation is only possible with considerable effort, i.e., by employing heated pipelines and extensive separation devices.

Further, an improved or at least a comparable degree of purity can be achieved with the process in accordance with the invention with considerably reduced time and cost expenditures than with the prior art processes. For example, in accordance with the invention, by the use of comparatively very small amounts of water, typically up to 50 weight % of the PA-6 amount to be purified, in comparison with the extraction or removal with hot water employed on the industrial scale which is far removed from the invention, it is possible to remove lactam from raw polyamide-6 containing 8 to 10 weight % of $\epsilon$-caprolactam, so that amounts of far below 0.1 weight % of $\epsilon$-caprolactam remain, using a simple, reliable and continuous operation. In the process, the caprolactam is extracted from the polymer melt by means of steam at a pressure which lies above atmospheric pressure and, preferably, with a counterflow of the separating agent, and is removed from the extruder together with the steam and small amounts of other extracted components. The steam is liquefied by expansion to normal pressure and cooling. In the process, the caprolactam always remains dissolved in the aqueous phase and does not lead to obstructions in the pipelines. The recovery of the caprolactam is also more efficient here, because it occurs in concentrated form because of the reduced amounts of water and, furthermore, because of the very short extraction time in the extruder, caprolactam almost exclusively goes into the extraction phase. Although the polyamide-6 as a polycondensate is not indifferent to water, it has been surprisingly noted that, in spite of the increased steam pressure over the polymer melt, no decomposition of the polyamides and practically no back formation into caprolactam takes place at the high temperatures of typically above 250° C. used with the process of the invention. This is obviously the result of the very short active time of typically 1 to 5 minutes in the extruder. It is also considered to be surprising that, in spite of this short contact time between polymer melt and steam in the extruder, such a high rate of discharge of the caprolactam and such intense purification of the polymer melt are achieved. Several effects, which in an advantageous manner complement or reinforce each other in accordance with the present process, contribute to this. For example, because of the increased pressure, the water partially dissolves in the polymer melt, which results in improved diffusion and increased substance exchange rates. The steam charged with the extracted substances is removed from the extruder under pressure. In comparison to conventional vacuum degassing with steam as the entrainer it is therefore possible in accordance with the present invention to employ considerably more water while still keeping the flow speed of the steam phase in the extruder lower. However, the extraction pressure in the extruder cannot be arbitrarily increased because at high pressures, particularly $\geq$ the critical pressure of the solvent, the solubility of the solvent in the polymer melt very greatly increases and has a negative effect on the operation of the process. With water as the extraction medium, pressures between 1 bar abs. and approximately 20 bar abs., for example, have proven to be advantageous. An equal-twist twin-screw kneader, which is constructed in accordance with the building block principle and therefore has great flexibility, is particularly suitable as extruder.

BRIEF DESCRIPTION OF THE DRAWINGS

The subject of the invention will be described in more detail by means of schematic drawings in which.

DESCRIPTION OF THE PREFERRED EMBODIMENTS

Figure 1:
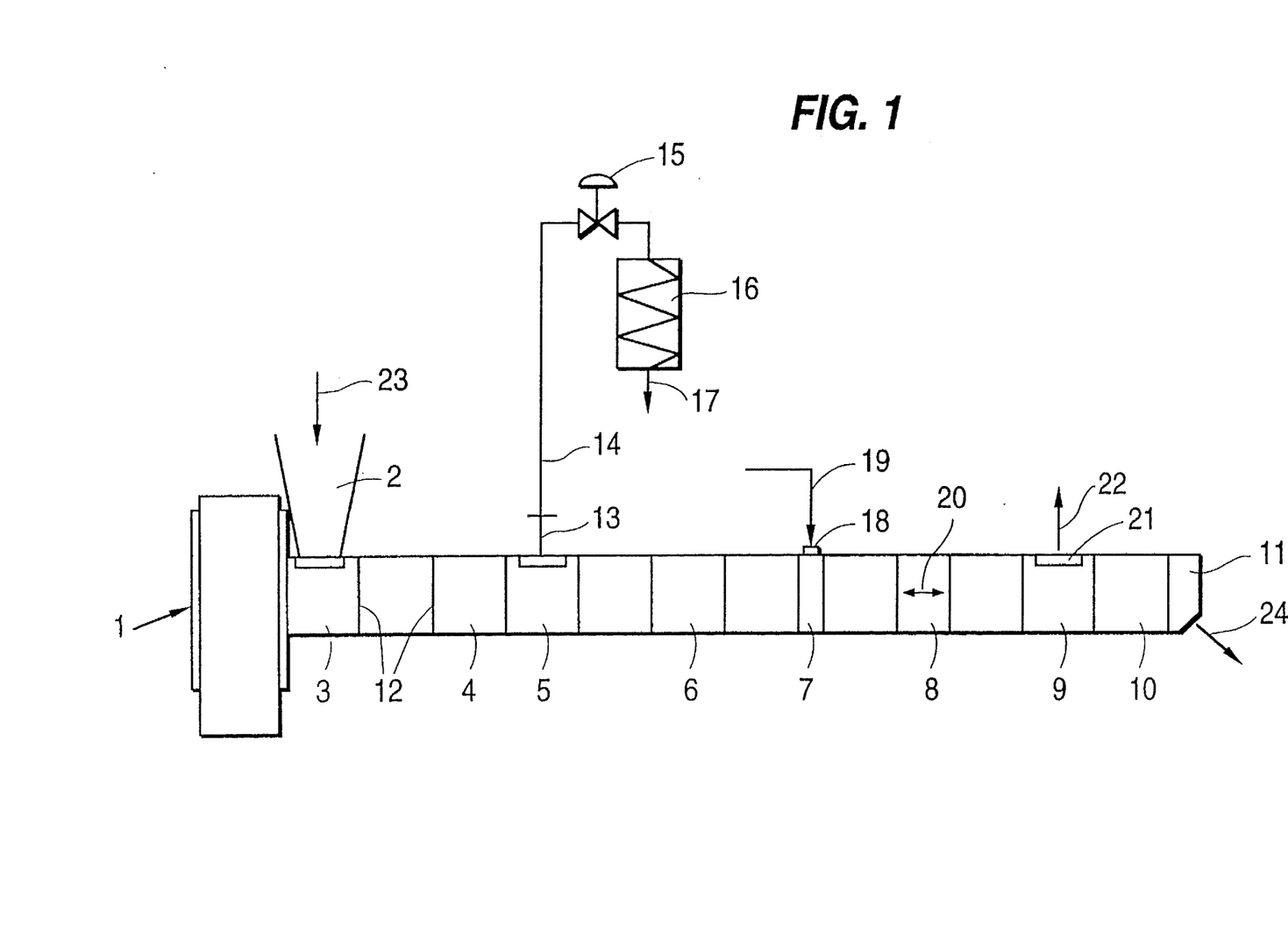
FIG. 1 shows an extruder with a single-stage introduction of the separating agent.

FIG. 1 shows an extruder 1 with a funnel tube 2, an inlet zone 3 which customarily is cooled, and a heating zone 4 for plasticizing, melting, or adjusting the temperature of the mixture of substances introduced into the extruder 1 in the molten state. A low pressure zone 5 follows the heating zone 4 and, via an extraction zone 6, makes a transition into a high pressure zone 7, to which a throttle device 8 is assigned.

A last low pressure zone 9 follows the throttle device 8 and, at the end, a last high pressure zone 10 which is assigned to extruder head 11.

The structure of the extruder 1, namely, a worm housing in accordance with the building block system, is indicated by lines 12. The pressure distribution in the extruder itself is essentially determined by the geometry of the worm or worms.

FIG. 1 furthermore shows a discharge socket 13 at the low pressure zone 5, which is connected via a line 14 and a control valve 15 with a heat exchanger 16, which has an outlet 17. The high pressure zone 7 has an inlet socket 18 in which a steam feed line 19 terminates.

A two-headed arrow 20 is intended to illustrate the adjustability of the throttle device 8.

The last low pressure zone 9 has a degassing opening 21 which is connected to a vacuum installation (not shown). A symbolic arrow 22 indicates the vacuum degassing.

The mixture of substances, symbolized by an arrow 23, is supplied to the funnel tube 2 and purified main component 24 exits at the extruder head 11.

In the execution of the process in accordance with the schematic representation of FIG. 1, the mixture of substances 23, namely, the impure thermoplastic polymer, is fed to the extruder 1. The inlet zone 3, which is customarily cooled, is followed by the heating of the mixture of substances in the heating zone 4. In the extraction zone 6, the side components or contaminants are extracted from the plasticized polymer by means of a solvent, for example, water. Steam from steam feed line 19 is supplied to the extruder via inlet socket 18 in the high pressure zone 7 for this purpose. The solvent flows counter to the flow of the plasticized polymer, absorbs the contaminants to be removed and is removed from the extruder in the low pressure zone 5 via line 14, control valve 15, which can participate in the determination of the residual pressure, and heat exchanger 16. The ratio of the amount of separating agent—in this case water—to the polymer to be purified is 1:20 to 1:2, preferably 1:10 to 1:5. A residual pressure, P, is absolutely set and maintained by means of control valve 15 in accordance with the function $P_c \geq P \geq 1$ bar.

The possibly still gaseous mixture of separating agent, i.e., solvent, and extracted low molecular weight compounds is liquefied and cooled in heat exchanger 16. This mixture is drawn off via outlet 17 and processed in a further process step, wherein the extracted substances, for example, $\epsilon$-caprolactam in the case of polyamide-6, are recovered and the regenerated separating agent is again returned to the extruder, if desired.

Extraction zone 6, wherein an intensive substance exchange between the plasticized polymer and the solvent phase is provided by means of an appropriate worm configuration, is delimited by two "melt seals" defined between heating, i.e., plastification or melting, zone 4 and the low pressure zone 5 and between the high pressure zone 7 and the last low pressure zone 9. A melt seal is generated by damming up the plasticized polymer. This can take place either by means of an appropriate worm structure or by the selection of suitable worm elements or, as in this case, by means of a suitably adjustable throttle device 8.

In the last and final low pressure zone 9, the thermal vacuum treatment is performed, wherein only the separating agent, in this case water, absorbed by the plasticized polymer, and residual low molecular weight compounds are removed by the application of a vacuum. Here, too, an improved final degassing is achieved, compared with the prior art, because the plasticized polymer in the extraction zone 6, which is at increased pressure, is charged to a higher degree with the solvent, which is released in the last low pressure zone 9 and results in a controlled foaming of the plasticized polymer.

By means of this and because of the increased substance exchange surface, a more extensive purification is achieved. Purified plasticized polymer 24 leaves the extruder via extruder head 11 and is either granulated or directly supplied to a subsequent processing step, for example, to a second processing extruder or a spinning device.

Figure 2:
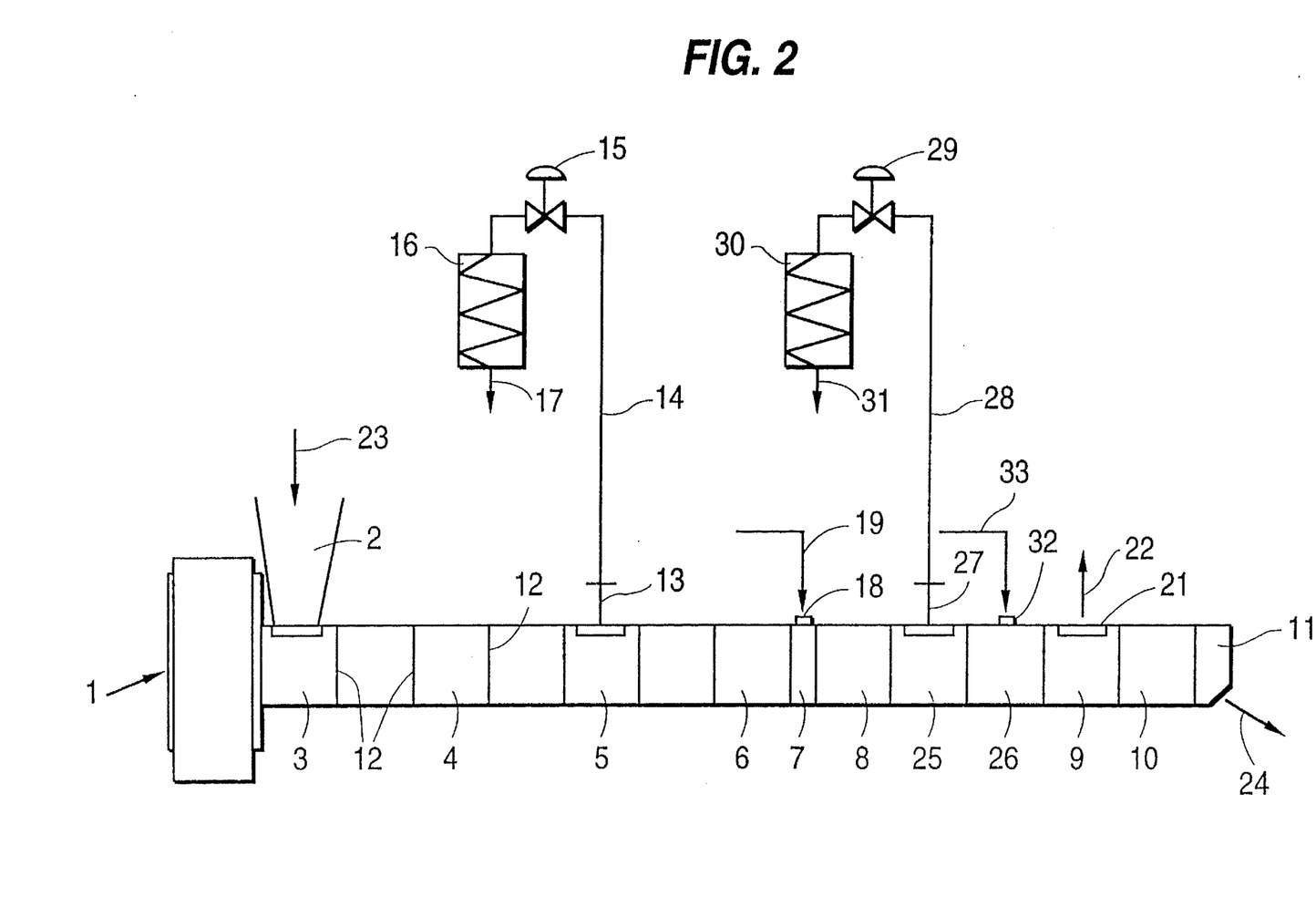
FIG. 2 shows an extruder with a dual-stage introduction of the separating agent.

Between the first high pressure zone 7 and the last low pressure zone 9, the extruder 1 in accordance with FIG. 2 has a second low pressure zone 25 and a second high pressure zone 26. A further inlet socket 32 and a pressure feed line 33 are assigned to the latter, while the second low pressure zone 25 has a further outlet socket 27. From there, a feed line 28 leads via a further control valve 29 to a further heat exchanger 30 with an associated drain 31.

FIG. 2 illustrates a further variant of the invention in a schematic, i.e., process-technological, manner, which is particularly suited to the extraction of higher amounts of contaminants from the plasticized polymer and/or the achievement of a very extensive purification. For example, monomers can be advantageously removed from polyamide-6 taken from a polycondensation reactor and containing from 8 to 10 weight % of $\epsilon$-caprolactam by means of this variant to the greatest extent, e.g., down to a residual monomer content of less than 1000 ppm of $\epsilon$-caprolactam. Water is again used here as the separating agent.

The first melt seal is again built up between the heating zone 4 and the first low pressure zone 5. A portion of the water is added in the high pressure zone 7 to the extruder via steam feed line 19, flows in the opposite direction, is charged with side components, and is finally discharged from the first low pressure zone 5.

A second extraction zone, which largely coincides with the second low pressure zone 26 and partially with the second high pressure zone, follows the first extraction zone 6. The second high pressure zone is of course delimited against the subsequent last low pressure zone 9 by a melt seal. A further portion of the water is supplied to the extruder in the second high pressure zone 26 via a further steam feed line 33. The still-remaining side components are extracted in the second extraction zone and are drawn off with the steam and fed to their individual further heat exchanger 30.

The melt seal between the extraction zone 6 and the second low pressure zone 25 can also be designed in a advantageous manner in such a way that the separating agent, which is supplied in the first high pressure zone 7 of the extruder, partially also flows in the flow direction of the plasticized polymer, so that a counterflow and a same direction flow extraction takes place. In this case the ratio of the separating agent amounts for the counterflow and the same direction flow extraction can be varied between 1:1 and 20:1.

As a rule, the amount of separating agent or amount of water for the second extraction zone is less than the amount of extraction agent for the first extraction zone 6, wherein a ratio of 1:2 to 1:10 has been shown to be particularly advantageous. The ratio of the entire amount of separating agent to the polymer to be purified is 1:10 to 1:1, preferably 1:10 to 1:2.

The purification process for impure thermoplastic polymers has been described herein by employing the extrusion apparatus of FIGS. 1 and 2 wherein only one extruder is used. However, it is also within the scope of this invention to employ two or more extruders connected in series behind each other, for example, and to combine the extraction process with a further, for example, downstream processing step. Furthermore, the separating process can be performed in several steps, wherein different process pressures are set in the individual extraction zones and/or different solvents, for example, water and $CO_2$ or $N_2$, are used. In addition, the use of two or more extruders offers the advantageous option of adapting the worm rpm to a changing consistency of the plasticized polymer. In particular, the process in accordance with the invention can also advantageously follow an upstream process, for example, a manufacturing process for raw plastics or a conventional sorting and/or purification process for recycled plastics.

Figure 3:
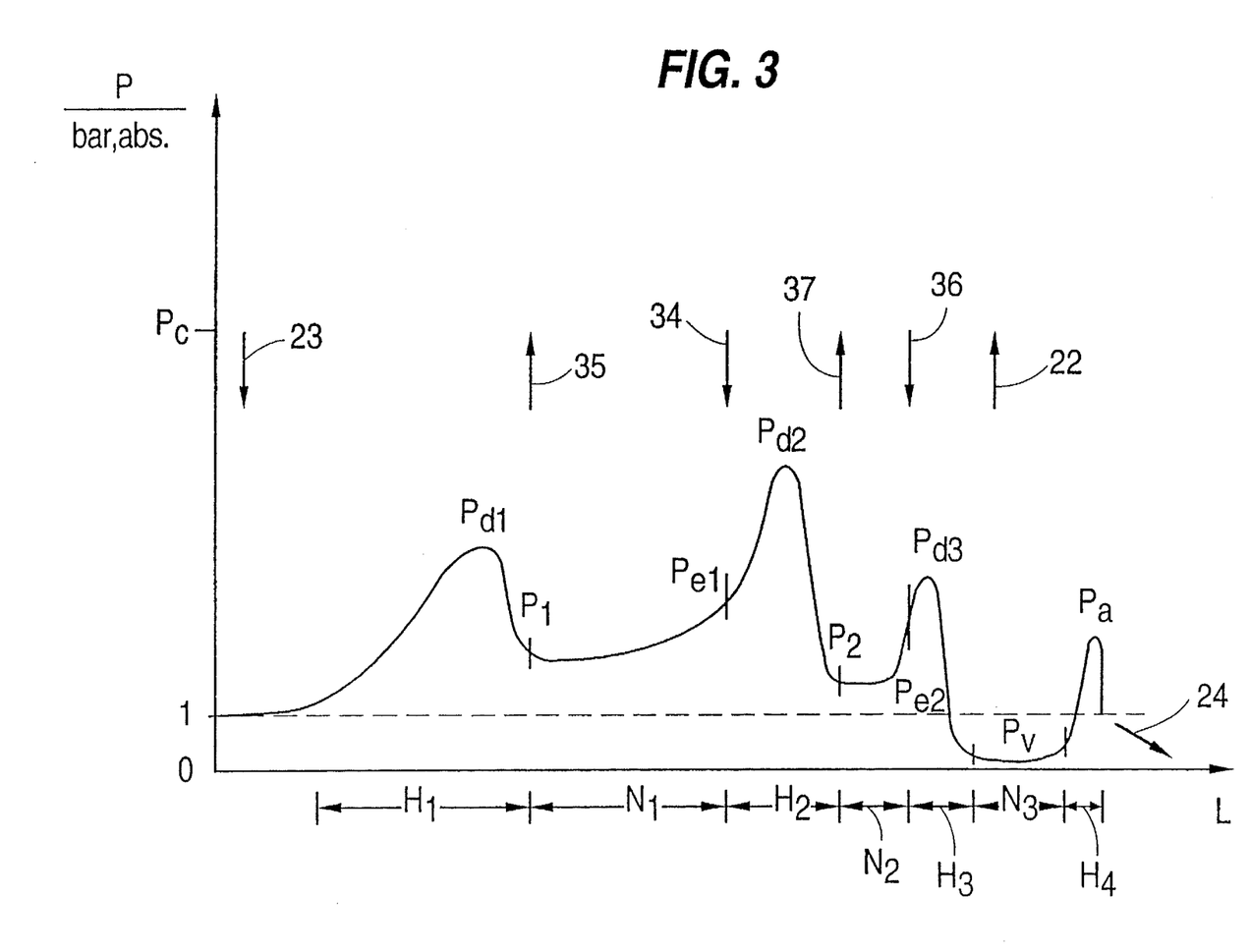
FIG. 3 shows a solvent extraction with reverse flow by means of a diagram of the course of pressure.
Figure 4:
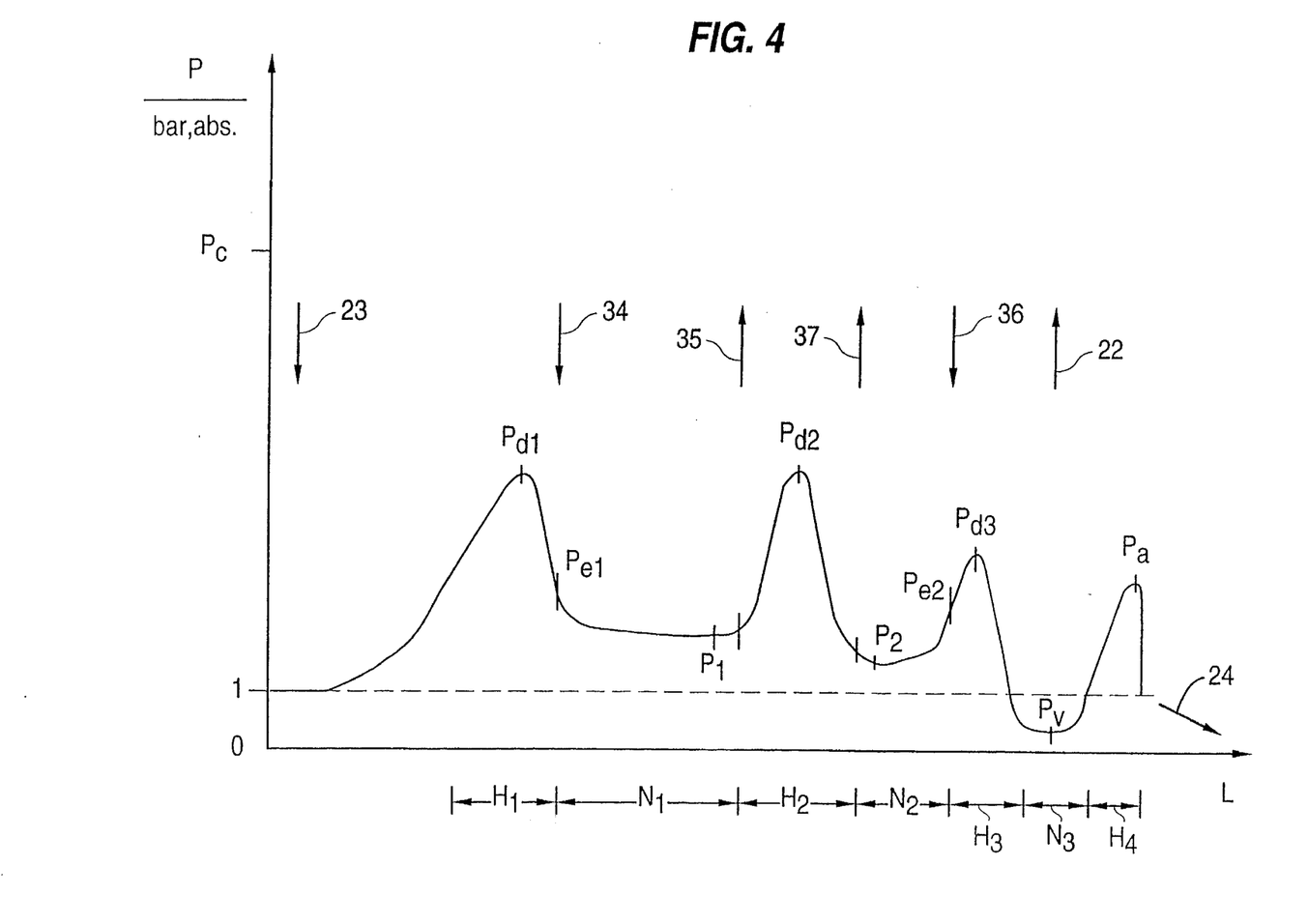
FIG. 4 shows the combination of reverse and forward flow by means of a further diagram.
Figure 5:
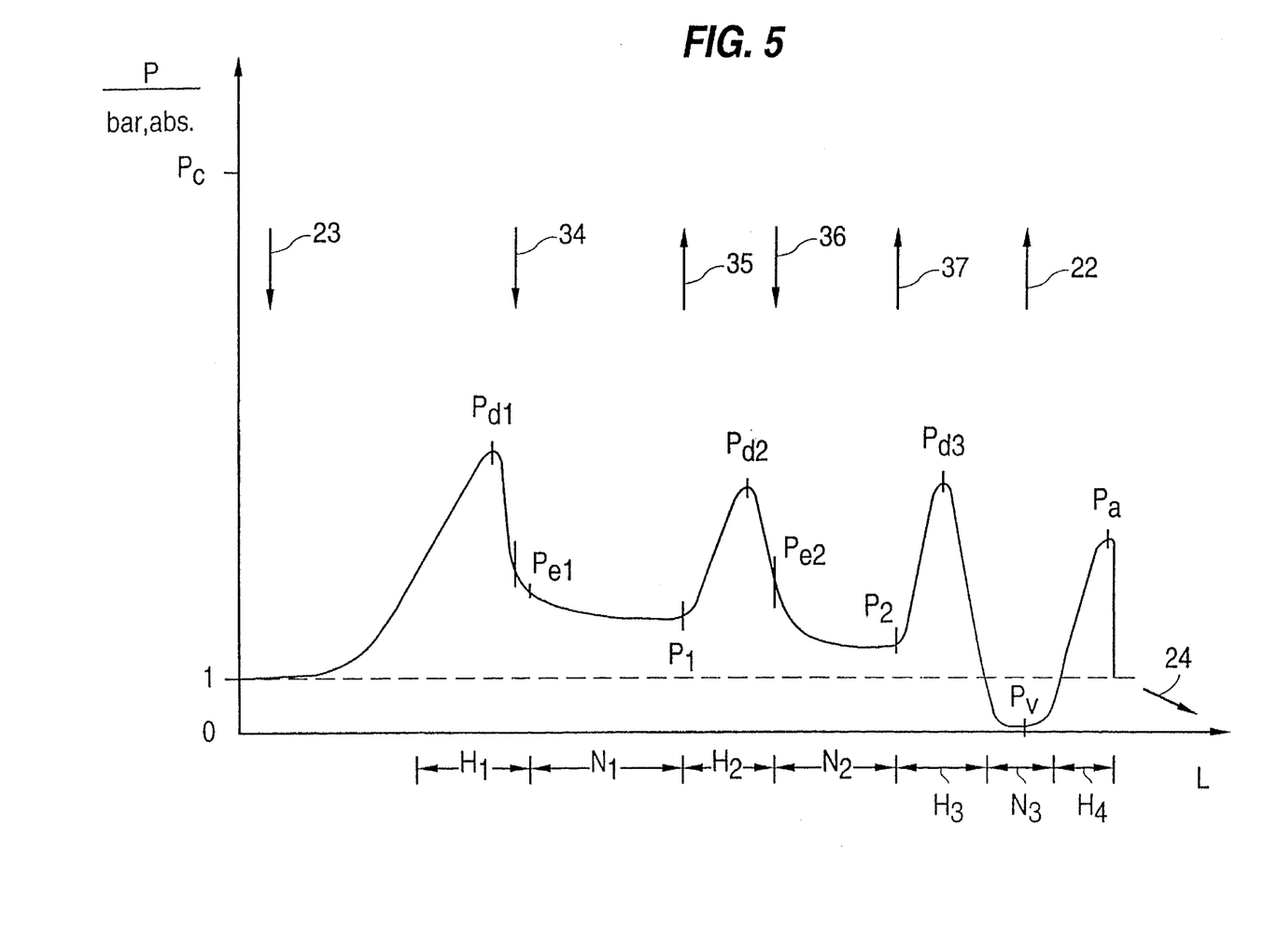
FIG. 5 shows forward extraction by means of a further diagram.

FIGS. 3 to 5 show the course of pressure in extruders during the operation of the process of the invention. In this case, introduction of the separating agent is respectively indicated by introduction arrows 34 and 36, and discharge of the charged separating agent by discharge arrows 35 and 37.

The course of pressure in accordance with FIG. 3 could occur in the extruder in accordance with FIG. 2. The pressure $P_{d1}$ builds up in the first melt seal and a strong high pressure zone H1 is created in this way. The second and third melt seals generated the pressures $P_{d2}$ and $P_{d3}$ form the second high pressure zone H2 and the third high pressure zone H3, respectively. At the end of the extruder, the length L of which forms the ordinate, is a fourth high pressure zone H4, corresponding to the discharge pressure $P_a$.

The position of the introduction arrow 34 makes clear that the separating agent in the rising branch of the first low pressure zone N1 is supplied at an introduction pressure $P_{e1}$ and seeks its way back, following the least resistance, and to a large extent is removed again, charged, at the residual pressure $P_1$, which is indicated by the discharge arrow 35.

Corresponding processes occur in the third high pressure zone H3 and the second low pressure zone N2 upstream thereof, as can be seen from the positions of the introduction arrow 36 and the discharge arrow 37. In this case, the introduction pressure $P_{e2}$ is considerably less than the introduction pressure $P_{e1}$, and the residual pressure $P_2$ in the second low pressure zone N2 is also set to be lower than that ahead of it and is only slightly above 1 bar. The final vacuum degassing 22 takes place in the third low pressure zone N3 at an underpressure $P_v$ which is clearly below 0.5 bar.

Thus, in the course of the reverse extraction in accordance with FIG. 3, the separating agent is essentially removed toward the back, but small amounts of separating agent are also carried along, overcoming the respective melt seal, from the low pressure zone N1 into the following second low pressure zone. This is also true for the transport of the plasticized polymer from the second low pressure zone N2 to N3.

FIG. 4 shows the process variation in which the second low pressure zone N2 (as in FIG. 1) is set to a counterflow of the separating agent, while melt and separating agent flow in one direction in the first low pressure zone.

The same direction flow principle has been retained as a whole in FIG. 5 by a corresponding arrangement of the introduction arrows 34 and 36 as well as the discharge arrows 35 and 37.

In the following examples, Examples 1 and 2 are not in accordance with the present invention. They are only intended to point out the advantages of the process of the invention in comparison to the prior art.

EXAMPLE 1: (Prior Art)

Recycled polyamide-6 (regranulate) with an $\epsilon$-caprolactam content of 6.400 mg/kg is processed in an equal-twist twin-screw kneader, Model ZSK 40, in accordance with FIG. 2, wherein the low pressure zones 5 and 25 are operated as thermal vacuum treatment zones with vacuum degassing. No separating agents or entrainers are added. The polymer melt purified in this manner is subsequently pelletized and analyzed for $\epsilon$-caprolactam. With a flow rate of 55 kg/h and a vacuum of 5 mbar in the first low pressure zone 5 and 4 mbar in the second low pressure zone 25, the $\epsilon$-caprolactam content is reduced to 1.590 mg/kg, corresponding to a 75% reduction of lactam. With this manner of operation, the $\epsilon$-caprolactam has a tendency to deposit in the pipelines to the evacuation system and to cause considerable technical difficulties, which can only be overcome with great effort.

EXAMPLE 2: (Prior Art)

The same initial material as in Example 1 is degassed, using water as the entrainer, but with otherwise unchanged process parameters as in Example 1. Respectively, 0.85 kg/h of water are introduced into the polymer melt via the steam feed lines 19 and 33. In the first low pressure zone 5, the vacuum is 9 mbar and, in the second and last low pressure zones 25 or 9, it is 8 mbar. In the process, the amount of $\epsilon$-caprolactam is reduced to 770 mg/kg, corresponding to an 88% reduction of lactam. Because of the already mentioned tendency of $\epsilon$-caprolactam to deposit on the walls of the pipelines to the evacuation system, here, too, a trouble-free operation can only be assured with great effort.

EXAMPLE 3: (In accordance with the invention)

Recycled polyamide-6 (regranulate) with an $\epsilon$-caprolactam content of 6.400 mg/kg is purified in an equal-twist twin-screw kneader, Model ZSK 40, in accordance with FIG. 1 by means of solvent extraction. At a flow rate of 20 kg/h, 4 kg/h of water are supplied to the extruder in the high pressure zone 7 at a pressure of 12 bar absolute via the steam feed line 19. A melt seal is built up with the aid of the throttle device 8, so that the largest part of the added water flows opposite the polymer melt and, in the process, is increasingly charged with the contaminants to be removed and is removed from the low pressure zone 5 of the extruder at a pressure of 4 bar absolute. A small portion of the added water is absorbed by the polymer melt and, together with the remaining contaminants, is removed in the last low pressure zone 9 at a vacuum of 1 mbar. The purified polymer melt 24 is subsequently pelletized and analyzed as to $\epsilon$-caprolactam content. In the process, the amount of $\epsilon$-caprolactam is reduced to 330 mg/kg, corresponding to a 95% reduction of lactam.

EXAMPLE 4: (In accordance with the invention)

Recycled polyamide-6 (regranulate) with an $\epsilon$-caprolactam content of 6.400 mg/kg is purified in an equal-twist twin-screw kneader, Model ZSK 40, in accordance with FIG. 1 by means of solvent extraction. At a flow rate of 20 kg/h, 2 kg/h of water and 2.1 kg/h of carbon dioxide are supplied to the extruder in the high pressure zone 7 at a pressure of 65 bar absolute. The largest part of the added separating agent flows opposite the polymer melt, in the process is increasingly charged with the contaminants to be removed and is removed from the low pressure zone 5 of the extruder at a pressure of 6 bar absolute. A portion of the added solvent mixture is absorbed by the polymer melt and, together with the remaining contaminants, is removed in the succeeding last low pressure zone 9 at a vacuum of 12 mbar. The purified polymer melt 24 is subsequently pelletized and analyzed as to $\epsilon$-caprolactam content. In the process, the amount of $\epsilon$-caprolactam is reduced to 590 mg/kg, corresponding to a 91% reduction of lactam.

EXAMPLE 5: (In accordance with the invention)

A raw polyamide-6 with an $\epsilon$-caprolactam content of 9.3 weight % is in an equal-twist twin-screw kneader, Model ZSK 40, in accordance with FIG. 2 by means of solvent extraction with water. At a flow rate of 22 kg/h of the mixture of substances, 8 kg/h of water are supplied to the extruder at a pressure of 4 bar absolute via the steam feed line 19 and removed to a great extent from the first low pressure zone 5 at a pressure of 3 bar absolute. A second extraction follows the first extraction. In the process, water is supplied to the extruder via the steam feed line 33 at a pressure of 2 bar abs., whereupon the added water flows opposite the polymer melt, in the process is increasingly charged with residual contaminants to be extracted and is removed from the second low pressure zone 25 at atmospheric pressure. A portion of the added water is absorbed by the polymer melt and, together with the possibly remaining small amounts of contaminants, is removed in the succeeding last low pressure zone 9 at a vacuum of 1 mbar. Subsequently, the purified polymer melt 24 is pelletized and analyzed as to $\epsilon$-caprolactam content. The $\epsilon$-caprolactam content could be reduced to 640 mg/kg, corresponding to a 99.3% reduction of lactam.

With the Examples 3 to 5 in accordance with the invention, the extracted caprolactam always remains dissolved in the aqueous phase and does not lead to obstructions of pipelines. Accordingly, a trouble-free, reliable, continuous operation is assured.

EXAMPLE 6: (In accordance with the invention)

Regarding the execution of the process of the invention with a gaseous separating agent, it should be noted that it was possible to separate the side component acetaldehyde from PET (polyethylene terephthalate) by means of the separating agent $CO_2$ and to reduce it to 1 ppm of residual acetaldehyde.

The invention has been described in detail with respect to preferred embodiments, and it will now be apparent from the foregoing to those skilled in the art that changes and modifications may be made without departing from the invention and its boarder aspects, and the invention, therefore, in the appended claims is intended to cover all such changes and modifications as fall within the true spirit of the invention.

What is claimed is:

1. A process for treating an impure thermoplastic polymer, including raw polymers and recycled polymers, during passage thereof through an extrusion apparatus to separate and remove low molecular weight compounds therefrom, the extrusion apparatus being comprised of a heated worm housing in which are defined, in the order recited, a heating zone, a first low pressure zone, an extraction zone, a first high pressure zone, a last low pressure zone, and a last high pressure zone, and an extruder head, the process comprising:

a. heating the impure thermoplastic polymer by passing the impure thermoplastic polymer through the heating zone of the extrusion apparatus to provide a plasticized polymer;

b. introducing a separating agent having a critical pressure, $P_c$, into the plasticized polymer passing through the first high pressure zone of the extrusion apparatus at an introduction pressure, $P_e$, the low molecular weight compounds of the plasticized polymer being at least partially soluble in the separating agent;

c. extracting at least a part of the low molecular weight compounds from the plasticized polymer into the separation agent during passage of the plasticized polymer through the extraction zone;

d. removing the separating agent charged with low molecular weight compounds from the extrusion apparatus as the plasticized polymer passes through a low pressure zone, which low pressure zone is one of upstream or downstream of the first high pressure zone and is upstream of the last low pressure zone, and which has a residual pressure, P, which is lower than the introduction pressure, $P_e$, in the first high pressure zone and which satisfies the requirement $1 \text{ bar} \geq P \geq P_c$;

e. collecting the separating agent charged with low molecular weight compounds as it is removed from the extrusion apparatus;

f. thermal vacuum treating the plasticized polymer as it passes through the last low pressure zone to vacuum degas the plasticized polymer at a pressure, $P_v$, for which $P_v < 0.5$ bar and thereby further remove separating agent and low molecular weight compounds from the plasticized polymer; and g. passing the plasticized polymer through the last high pressure zone to the extruder head from which purified thermoplastic polymer is recovered.

2. The process according to claim 1, wherein thermal vacuum treating the plasticized polymer as it passes through the last low pressure zone to vacuum degas the plasticized polymer is performed at a pressure, $P_v$, for which $P_v < 0.05$ bar.

3. The process according to claim 1, wherein the separating agent passes through the extrusion apparatus in a direction which is primarily counter to that of the passage of the plasticized polymer as a counterflow, and wherein the low pressure zone, from which the separating agent charged with low molecular weight compounds is removed as the plasticized polymer passes therethrough in the first low pressure zone, is upstream of the first high pressure zone.

4. The process according to claim 1, wherein thermal vacuum treating the plasticized polymer is performed only after the content of low molecular compounds therein has been lowered, by removal of low molecular compounds from the plasticized polymer, to <10% of the original content of low molecular compounds within the impure thermoplastic polymer.

5. The process according to claim 1, wherein the residual pressure, (P), ranges between 1 and 8 bar, and wherein the introduction of separating agent takes place at an introduction pressure, $P_e$, which lies in a range which satisfies the requirement $P < P_e < P_c$.

6. The process according to claim 1, wherein the extrusion apparatus further comprises a second high pressure zone into which additional separating agent is introduced at an introduction pressure, $P_e$, prior to passage of the plasticized polymer through the last high pressure zone; and a second low pressure zone which has a residual pressure, P, which is lower than the introduction pressure, $P_e$ and which satisfies the requirement $1 \text{ bar} \geq P \geq P_c$, and from which the additional separating agent charged with low molecular weight compounds is removed as the plasticized polymer passes therethrough, the second high pressure zone and the second low pressure zone being positioned downstream of the first low pressure zone and the first high pressure zone, and upstream of the last low pressure zone, wherein the separating agent and additional separating agent pass through the extrusion apparatus in a direction which is primarily counter to the passage of the plasticized polymer as counterflows, and wherein the low pressure zone from which the separating agent charged with low molecular weight compounds is removed as the plasticized polymer passes therethrough is the first low pressure zone having residual pressure, P, and the low pressure zone from which the additional separating agent charged with low molecular weight compounds is removed as the plasticized polymer passes therethrough is the second low pressure zone.

7. The process according to claim 6, wherein the separating agent is water, wherein more than 50 weight % of the water employed is introduced into the first high pressure zone, wherein less than 50 weight % of the water employed is introduced into the second high pressure zone, wherein the first low pressure zone has a residual pressure, $p_1$, and the second low pressure zone has a residual pressure, $P_2$, and wherein the residual pressure, $P_1$, is higher than the residual pressure, $P_2$, and $P_1 - P_2$ is at least 1 bar.

8. The process according to claim 1, wherein the removal of the separating agent takes place at a feed pressure, $P_f$, which satisfies the requirement for the residual pressure, P.

9. The process according to claim 1, wherein the separating agent is water.

10. The process according to claim 1, wherein the separating agent is water which is introduced into the plasticized polymer as steam and which is introduced in an amount which is at least 200% by weight based on the initial weight of low molecular compounds in the impure thermoplastic polymer.

11. The process according to claim 1, wherein the separating agent is one of $CO_2$ or $N_2$.

12. The process according to claim 1, wherein the separating agent is a mixture of a solvent which is liquid at 20° C. and 1 bar abs. and one of $CO_2$ or $N_2$.

13. The process of separating low molecular weight compounds from one of a recycled plastic or a recycled plastic mixture, comprising:

treating the recycled plastic or recycled plastic mixture according to the process of claim 1.

14. The process of separating low molecular weight compounds from a raw plastic in the form of a mixture of substances, comprising:

treating the raw plastic according to the process of claim 1.

15. The process according to claim 14, wherein the raw plastic is polyamide-6 containing, as a low molecular weight compound, $\epsilon$-caprolactam.

16. The process according to claim 1, wherein the impure thermoplastic polymer is a solid, wherein heating in step (a) is performed at a temperature effective to melt the impure thermoplastic polymer and provide a plasticized polymer which is a melt.

17. The process according to claim 1, wherein the impure thermoplastic polymer is introduced into the extrusion apparatus as a melt, and wherein heating in step (a) brings the melt to a temperature effective for extrusion thereof.

18. The process according to claim 1, wherein the impure thermoplastic polymer is introduced into the extrusion apparatus as a polymer paste, and wherein heating in step (a) brings the polymer paste to a temperature effective for extrusion thereof.

19. The process according to claim 1, wherein the impure thermoplastic polymer is introduced into the extrusion apparatus as a polymer solution, and wherein heating in step (a) brings the polymer solution to a temperature effective for extrusion thereof.

* * * * *